(12) United States Patent
Kimoto et al.

(10) Patent No.: US 10,595,390 B2
(45) Date of Patent: Mar. 17, 2020

(54) PLASMA TORCH

(71) Applicant: Koike Sanso Kogyo Co., Ltd., Edogawa-ku, Tokyo (JP)

(72) Inventors: Ryosuke Kimoto, Gunma (JP); Masatoshi Motoyama, Gunma (JP); Tetsuya Iizuka, Gunma (JP); Susumu Kanda, Edogawa-ku Tokyo (JP); Katsuhiko Sakamoto, Edogawa-ku Tokyo (JP); Akira Hurujo, Edogawa-ku Tokyo (JP); Daiji Sakai, Edogawa-ku Tokyo (JP)

(73) Assignee: KOIKE SANSO KOGYO CO., LTD., Edogawa-Ku, Tokyo (JP)

( * ) Notice: Subject to any disclaimer, the term of this patent is extended or adjusted under 35 U.S.C. 154(b) by 824 days.

(21) Appl. No.: 14/912,667

(22) PCT Filed: Aug. 18, 2014

(86) PCT No.: PCT/JP2014/071578
§ 371 (c)(1),
(2) Date: May 31, 2016

(87) PCT Pub. No.: WO2015/025819
PCT Pub. Date: Feb. 26, 2015

(65) Prior Publication Data
US 2016/0286637 A1    Sep. 29, 2016

(30) Foreign Application Priority Data
Aug. 20, 2013   (JP) ................... 2013-170324

(51) Int. Cl.
*H05H 1/28* (2006.01)
*B23K 10/00* (2006.01)
*H05H 1/34* (2006.01)

(52) U.S. Cl.
CPC ............... *H05H 1/28* (2013.01); *B23K 10/00* (2013.01); *H05H 1/34* (2013.01); *H05H 2001/3436* (2013.01); *H05H 2001/3457* (2013.01)

(58) Field of Classification Search
CPC ........ B23K 10/00–10/027; H05H 1/28; H05H 1/34
See application file for complete search history.

(56) References Cited

U.S. PATENT DOCUMENTS

| | | | |
|---|---|---|---|
| 7,019,254 B2 * | 3/2006 | MacKenzie | B23K 9/291 219/121.48 |
| 2003/0213782 A1 * | 11/2003 | MacKenzie | B23K 9/291 219/121.48 |
| 2005/0082263 A1 | 4/2005 | Koike et al. | |

FOREIGN PATENT DOCUMENTS

| | | | |
|---|---|---|---|
| JP | 2005329434 A | 2/2005 | |
| JP | 2005118816 A | 5/2005 | |
| (Continued) | | | |

OTHER PUBLICATIONS

International Search Report of PCT/JP2014/071578, dated Sep. 22, 2014 (1 pg.).

*Primary Examiner* — Ibrahime A Abraham
*Assistant Examiner* — John J Norton
(74) *Attorney, Agent, or Firm* — Shlesinger, Arkwright & Garvey, LLP

(57) ABSTRACT

The plasma torch has a nozzle and body. The nozzle has an inner nozzle and inner cap fastened to the body with the inner nozzle. Annular water passage and a plurality of independent water passages are formed between the inner nozzle and inner cap. Force applied when the inner cap is fastened to the nozzle base is transmitted via partitions. The torch body has a water supply port and drain port. At least one of the water supply port and drain port is configured as (Continued)

a groove extending on a plane crossing the axis and is connected to the water passage. When the nozzle is fastened to the torch body, one of the independent water passages communicates with the water supply port and another communicates with the water drain port. Rear end surface of inner nozzle is in contact with end surface of the nozzle base thereby obtaining electrical conductivity.

1 Claim, 5 Drawing Sheets

(56) References Cited

FOREIGN PATENT DOCUMENTS

| JP | 2005118817 A | 5/2005 |
|---|---|---|
| JP | 2012028682 A | 2/2012 |

* cited by examiner

PLASMA TORCH

TECHNICAL FIELD

The present invention relates to a plasma torch in which a nozzle for spraying a plasma arc toward a workpiece to be processed in order to cut the workpiece or to melt the base material can be reliably attached to the torch body and in which an effective cooling of the nozzle can be realized.

BACKGROUND ART

For example, when cutting the material to be cut such as a steel plate or a stainless steel plate, the plasma cutting method capable of improving a cutting speed with respect to the gas cutting method is increasingly adopted. In the plasma cutting method, in order to cut the material to be cut, a plasma arc is sprayed to the material while melting the base material by the heat of the plasma arc and removing the molten material by the energy of the sprayed plasma arc.

The Applicant owns the patent of the plasma torch indicated in Patent Document 1. Further, the Applicant proposed a nozzle capable of realizing the effective cooling by cooling water by attaching it to the plasma torch (see Patent Document 2). The configurations of the plasma torch and the nozzle will be briefly described with reference to FIG. 5.

In the nozzle 52, the ejecting hole 52a for spraying plasma arc is formed in the center. Further, the annular passage 52b of the cooling water and a plurality of independent water passages 52c which communicate with the annular passage 52b are formed on the nozzle 52. By attaching the nozzle 52 with the torch body 51, the water passages 53a and 53b for cooling the nozzle 52 are formed in the plasma torch. In particular, the torch body 51 has the water supply port 54a which is connected to the water passage 53a for supplying cooling water to the nozzle 51 and the water drain port 54b which is connected to the water passage 53b for draining the cooling water which passes through the nozzle 52.

Both of the water supply port 54a and the water drain port 54b or either the water supply port 54a or the water drain port 54b are configured as a groove connected to the water passages 53a and 53b, which extends on a plain which crosses the axes of the water passages 53a and 53b. Further, the interval on the circumference of a circle between the ends of the grooves or the interval on the circumference between an end of one of the grooves and an end of the supply port 54a or the drain port 54b is greater than the width on the circumference of a circle of the independent water passage 52c formed in the nozzle 51 or the pitch on the circumference of the independent water passage. Thus, when the nozzle 52 is attached, one of the independent water passages 52c formed in the nozzle 52 is communicated with the water supply port 54a. Further, another independent water passage 52c is communicated with the drain port 54b.

A plurality of divided pieces 55c for forming the water passage 52c is formed on the outer periphery of the nozzle 52. The nozzle 52 has the inner nozzle 55 whose end surface 55a on the rear end side (the plasma torch side) is an energizing surface, the outer nozzle 56 for forming the cooling water passage formed between the inner nozzle 55 and the outer nozzle 56, and the secondary airflow cap 57 for fastening the nozzle 52 to the torch body 51.

When screwing the secondary airflow cap 57 in attaching the nozzle 52 to the torch body 51, the nozzle 52 is fixed when the end face 55a on the rear side (the plasma torch side) of the inner nozzle 55 becomes in contact with the energizing surface 58a formed on the nozzle base 58 of the plasma torch. With the fixation of the nozzle 52, the annular cooling water passage 52b is formed on the position closer to the distal end side than the divided pieces (the ejecting hole side) between the inner nozzle 55 and the outer nozzle 56. Further, the plurality of independent cooling water passages 52c which communicate with the cooling water passage 52b are formed by the divided pieces. Thus, one of the independent cooling water passages 52c formed in the nozzle 52 communicates with the water supply port 54a for supplying the cooling water and the cooling water provided to the nozzle 52 flows through the independent water passage 52c to the annular cooling water passage 52b on the distal end side and thereafter the cooling water is discharged. Thus, the nozzle 52 can be cooled till the distal end portion of the nozzle 51 thereby preventing excessive heating due to the heat of the plasma arc.

PRIOR ART DOCUMENTS

Patent Documents

Patent Document 1: Japanese Patent No. 3984584
Patent Document 2: Japanese Laid-Open Patent Application No. 2005-118816

SUMMARY OF THE INVENTION

Problems to be Solved by the Invention

In the configuration plasma torch as described above, when fastening the secondary airflow cap 57 to the torch body 51, a fastening force is transmitted via the outer nozzle 56 to the inner nozzle 55 thereby pressing the end surface 55a at the rear end side of the inner nozzle 55 on the energizing portion 58a of the nozzle base 58. The step portion 55b is formed on the wall portion at the ejecting hole 52a side of the inner nozzle 55 and the distal portion 56a of the outer nozzle 56 is engaged in the step portion 55b thereby transmitting the fastening force. In particular, in view of making the nozzle 52 as small as possible, it is impossible to increase the size of the step portion 55b which is the portion that transmits the fastening force from the outer nozzle 56 to the inner nozzle 55, the processing becomes difficult.

Further, the end surface 55a at the rear side of the inner nozzle 55 is in contact with the energizing portion 58a formed on the nozzle base 58 thereby making an electric connection. Thus, the reliable contact of the end surface 55a at the rear side of the inner nozzle 55 with the energizing portion 58a of the nozzle base 58 is the highest priority. Thus, a gap is provided between the end surface 55c at the rear side of a divided piece formed in the inner nozzle 55 and the supply port 54 or the drain port 54b formed in the torch body 51. With this gap, an annular water passage is formed. By the annular water passage being formed, a part of the cooling water does not reach the tip of the nozzle and there is a possibility that the efficient cooling cannot be obtained.

Therefore, an object of the present invention is to provide a plasma torch which can effectively cool the nozzle till the ejecting hole of plasma arc and which has a stable energizing performance.

Means for Solving the Problem

In order to solve the above problem, a plasma torch according to the present invention, comprising:
a nozzle in which an ejecting hole disposed in the center of the nozzle for ejecting a plasma arc, an annular water passage for cooling water, and a plurality of independent water passages which communicate with the annular passage are formed; and a torch body in which a plurality of water passages for circulating cooling water for cooling the nozzle, wherein the nozzle includes:

an inner nozzle which ejects a plasma arc; and an inner cap which is fastened to the torch body with the inner nozzle, wherein when the inner nozzle is fitted to the inner cap, the annular water passage is formed between the inner nozzle and the inner cap, the plurality of independent water passages which communicate with the annular water passage are formed by a plurality of partitions and a fastening force for fastening the inner cap to the torch body is transmitted from the inner nozzle to the torch body via the plurality of partitions, wherein the torch body includes:

a water supply port which is connected to one of the independent water passages for supplying the cooling water to the nozzle; and a water drain port which is connected to one of the plurality of the independent water passages for draining the cooling water which has passed through the nozzle, wherein the water supply port and the water drain port are formed on an end surface of a nozzle base having electrical conductivity, at least one of the water supply port and the water drain port is configured as a groove connected to one of the water passages, the groove extends on a plane which crosses the axes of the water passage, and the interval on a circumference of a circle between the ends of both grooves or the interval on the circumference of the circle between an end of one of the grooves and an end of the water supply port or the water drain port is greater than a pitch on the circumference of the circle of the partitions formed on the nozzle for forming independent water passages, and wherein when the nozzle is fastened to the torch body, one of the independent water passages formed on the nozzle communicates with the water supply port, another one of the independent water passages formed on the nozzle communicates with the water drain port, and an end surface at a partition side of the inner nozzle constituting the nozzle is able to be in contact with an end surface of the nozzle base so as to obtain energization.

Effect of the Invention

In the above plasma torch, the force for attaching the nozzle to the torch body is transmitted from the outer nozzle to the inner nozzle via the partitions which form independent water passages which are formed between the inner nozzle and the inner cap when the inner nozzle is fitted to the inner cap. That is, a force transmission portion is disposed at the torch body side of the nozzle. Thus, the size can be enlarged without changing the magnitude of the nozzle, which contributes to easiness of the processing.

Further, the energization surface at the torch body side is formed on the end surface of the nozzle base in which the water supply port and the water drain port for the cooling water are formed. When fastening the inner cap to the torch body, the end surface is in contact with an end surface on the partition side of the inner nozzle, thereby obtaining electrification. Thus, a gap is not formed between the inner nozzle and the nozzle base, and all the cooling water supplied from the torch body to the nozzle flows from the independent water passages to the annular water passage, which contributes to effective cooling to the nozzle tip.

In particular, since the end surface at the partition side of the inner nozzle and the end surface of the nozzle base are respectively configured as an electrification surface and the inner diameter sides of both of the end surfaces form a passage for the cooling water. Thus, it is possible to maintain a stable temperature irrespective of an elapsed time increase for plasma processing and to exhibit stable energization properties.

EMBODIMENTS FOR CARRYING OUT THE INVENTION

Figure 1:
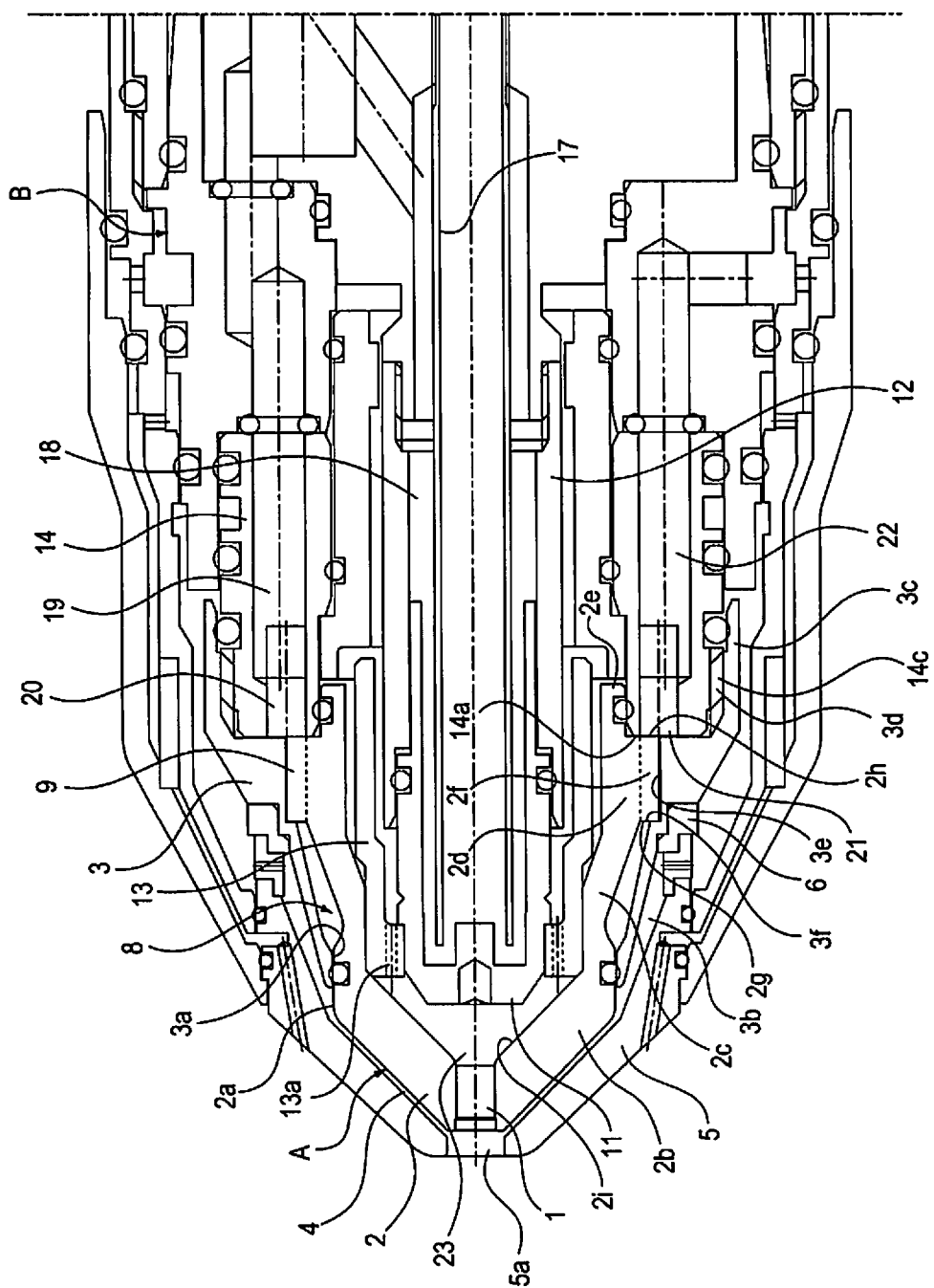
FIG. 1 a diagram illustrating the configuration of the main portion of a plasma torch according to the present embodiment FIG. 2 a diagram illustrating the configuration of a nozzle base of the torch body FIG. 3 a diagram illustrating the configuration of the outer nozzle FIG. 4 a cross-sectional view illustrating the configuration of the inner nozzle FIG. 5 a diagram illustrating the configuration of a conventional plasma torch

The configuration of a plasma torch according to the present invention will be explained below. The plasma torch according to the present invention is configured to be able to realize effective cooling by reliably providing cooling water to a tip side of the nozzle and to form a stable pilot arc between an electrode and the nozzle by reliably energizing the nozzle.

The plasma torch according to the present invention has an inner nozzle which ejects plasma arc and an inner cap which is fastened to the torch body with the inner nozzle. When the inner nozzle is fitted to the inner cap, a plurality of independent water passages which communicate with an annular water passage are formed between the inner nozzle and the inner cap by the annular water passage and partitions. In particular, a fastening force for fastening the inner cap to the torch body is transmitted to the inner nozzle via the partitions and the inner nozzle becomes in contact with the torch body.

The annular water passage is formed at the tip side (the ejecting hole side, hereinafter the same) of the nozzle. The independent water passages are formed at the rear end side (the torch body side when attaching the nozzle to the torch body, hereinafter the same).

When the inner nozzle is fitted to the inner cap, the partitions perform the function of forming a plurality of independent water passages and the function of transmitting to the inner nozzle a fastening force by which the inner cap is fastened to the torch body. It is not limited whether the partitions should be formed either on the outer peripheral surface of the inner nozzle or on the inner peripheral surface of the inner cap.

When the partitions are formed on the inner nozzle, the end surfaces at the rear end side of the partitions function as energizing surfaces which become in contact with the end surface of the nozzle base which has electric conductivity and which constitutes the torch body. When the partitions are formed on the inner cap, it is preferable to form a flange on the end portion at the rear side of the inner nozzle, which is in contact with the end surface at the rear end side of the partitions and to obtain electrical conductivity with the partitions being connected to the end surface of the nozzle base via the flange.

The configuration for attaching the nozzle to the torch body is not limited. This configuration may be such that the inner cap itself is fastened to the torch body by screwing or such that a cap-shaped member which is disposed outside the inner cap is screwed to the torch body so that the nozzle is fastened to the torch body. In any case, it is sufficient that a fastening force for fastening the nozzle to the torch body is transmitted from the inner cap to the inner nozzle via the partitions so that the end surface of the inner nozzle becomes in contact with the end surface of the nozzle base.

The water supply port and the water drain port are respectively connected to water passages formed on the torch body. When the nozzle is attached to the torch body, the independent water passages formed on the nozzle communicate with the water supply port and the water drain port formed on the torch body. At the same time, the end surface at the rear end side of the partitions which constitute independent water passages becomes in contact with the end surface of the nozzle base which has electric conductivity and which constitutes the torch body. The water supply port and the water drain port are formed on the nozzle base which constitutes torch body.

The shapes of the water supply port and the water drain port are not limited, and these ports may be a hole with a circular shape, an elongated shape, a rectangular shape, or other shape. In the plasma torch according to the present invention, at least one of the water supply port and the water drain port is configured as a groove which extends in a plain which crosses the axes of the water passages. Namely, the groove is formed with the shape protruding from a water passage in a cross-section. In particular, it is preferable that the opening areas of the water supply port and the water drain port are larger than the cross-section areas of the water passages. Further, it is preferable that the water supply port and the water drain port are respectively formed with an arc shape of a circle with the axis of the torch body being the center of the circle.

By configuring the water supply port or the water drain port as the above explained groove, when the nozzle is opposed to the water supply port and the water drain port, one of the independent water passages reliably communicate with the water supply port or the water drain port.

When both of the water supply passage and the water drain passage are formed as grooves or either the water supply passage or the water drain passage is formed as a groove, it is preferable that the interval between the end portions of the grooves or the interval between the end portion and an end portion of the other port is larger than the width of independent water passage (length on a plane). By the configuration that the interval between the end portion and an end portion of the other port is larger than the width of independent water passage, when the nozzle is attached to the torch body, any one of independent water passages does not communicate with both of the water supply port and the water drain port, which enables an individual independent water passage to perform either the function for supplying the cooling water or the function for draining the cooling water.

Next, the configuration of a plasma torch according to the present embodiment will be described with reference to figures. The plasma torch according to the present embodiment is constituted by the torch body B and the nozzle A, and the configuration of the nozzle A will be explained first.

The plasma torch according to the present embodiment is configured to spray the secondary air flow along with the plasma arc. However, the presence of the secondary airflow is not limited in the present invention. That is, the plasma torch according to the present embodiment is configured to effectively cool the ejecting hole on the nozzle A for ejecting the plasma arc and it does not matter whether there is a secondary airflow or a higher airflow such as a tertiary airflow around the plasma arc which is ejected from the ejecting hole.

The nozzle A is constituted of the inner nozzle 2 in which the ejecting hole 1 is formed in the center for ejecting plasma arc and in which the cylindrical wall 2a is provided at a predetermined portion of the outer peripheral, and the inner cap 3 which has the fitting hole 3a in the center into which the wall portion 2a of the inner nozzle 2 is fitted.

The secondary airflow cap 5 is disposed at the outer periphery side of the inner cap 3 via the insulator 6 by which the secondary airflow passage 4 is formed between the outer circumferential surface of the inner cap 3 and the secondary airflow cap 5. The ejecting port 5a is formed at the center of the tip of the secondary airflow cap 5 for ejecting plasma arc and the secondary airflow.

When attaching the nozzle A to the torch body B, the secondary airflow cap 5 can be used. However, in the present embodiment, by fastening the inner cap 3 to the nozzle base 14 which constitutes the torch body B, the nozzle A can be attached.

The ejecting hole 1 is formed at the center of the inner nozzle 2. Further, the tapered portions 2b and 2c (tapered surfaces 2b and 2c) are formed such that the tapered portions are widened in two stages toward the rear end side. The cylindrical wall 2a is formed between the tapered portions 2b and 2c. The base portion 2d which is parallel to the axis is formed continuously to the portion which has the maximum diameter of the tapered portion 2c. Further, the fitting portion 2e which fits to the nozzle base 14 of the torch body B is formed continuously to the base portion 2d.

On the outer periphery of the base portion 2d, a plurality of (eight in the present embodiment) partitions 2f are formed. By the partitions 2f, the base portion 2d is divided into a plurality of portions each of which constitutes an independent water passage. The partitions 2f have the function of transmitting a fastening force by the inner cap 3 when the nozzle A is attached to the nozzle base 14 of the torch body B. Thus, the front end surface 2g and the rear end surface 2h are formed to be perpendicular to the axis.

In particular, the rear end surface 2h is formed not only on the partitions 2f, but also on the base portion 2d of the inner nozzle 2. Therefore, when the description that "the rear end surface 2h of the inner nozzle 2" in the following explanation is intended to include the rear end surface of the base portion 2d and the rear end surface of the partitions 2f. The rear end surface 2h works as an energization surface which is energized by being in contact with the end surface 14a of the nozzle base 14 of the torch body B.

The plasma chamber 23 is formed between the inner surface 2i of the inner nozzle 2 and the front surface of the electrode 11 when the nozzle A is attached to the torch body B. On the outer periphery of the wall portion 2a and on the outer periphery of the fitting portion 2e, the groove 2j for attaching an O-ring is provided respectively.

The fitting hole 3a to which the wall portion 2a of the inner nozzle 2 fits is formed at the center of the inner cap 3. The tapered portion 3b (tapered surface 3b) which is gradually widened is formed continuously to the fitting hole 3a. Further, the cylindrical base portion 3c is formed continuously to the portion which has the maximum diameter of the tapered portion 3b. The threaded portion 3d to which the torch body B is screwed is provided on the inner surface of the base portion 3c.

The receiving portion 3e for receiving the partitions 2f formed on the inner nozzle 2 when the inner nozzle 2 fits to the inner cap 3 is formed on the inner surface of the inner cap 3. At the front end of the receiving portion 3e, the contact surface 3f for being in contact with the front end surfaces 2g of the partitions 2f is formed. The inner diameter of the receiving portion 3e is slightly greater than the outer diameter of the partitions 2f of the inner nozzle 2. Further, the height of the contact surface 3f is set such that the contact surface 3f is in contact with the front surfaces 2g of the partitions 2f with a contact area sufficient for transmitting the fastening force when the inner cap 3 is fastened. Further, the length of the receiving portion 3e is slightly longer than the length of the partitions 2f.

When the inner nozzle 2 is fitted into the inner cap 3 which is constituted as explained above, the annular water passage 8 through which the cooling water passes is formed between the tapered portion 2c and the tapered portion 3b. Further, by the front end surface 2g of the partitions 2f of the inner nozzle 2 being in contact with the contact surface 3f of the inner cap 3, the independent water passages 9 which communicate with the annular water passage 8 are formed along the partitions 2f.

When the inner cap 3 and the inner nozzle 2 are combined as an integrated body, the rear end surface 2h of the partition 2f including the rear end surface of the base portion 2d of the inner nozzle 2 is perpendicular to the axis of the nozzle A and slightly protrudes from the rear end surface of the receiving portion 3e of the inner cap 3. Thus, when the nozzle A is attached to the torch body B, the rear end surface 2h of the inner nozzle 2 is reliably in contact with the nozzle base 14 of the torch body B. Further, the rear end surface 2h is in contact with the end surface 14a of the nozzle base 14 thereby connecting one of the independent water passages 9 with the water supply passage 20 and the water drain passage 21 formed on the nozzle base 14.

In the nozzle A constituted as explained above, the cooling water supplied to one of the independent water passages 9 is introduced to the annular cooling water passage 8 from the independent water passage 9. At the annular cooling water passage 8, the cooling water is in contact with the tapered portion 2c and cools it. Thereafter, the cooling water is drained from the independent water passage 9 disposed at the opposite side of the independent water passage 9 to which the cooling water is supplied.

Therefore, all the supplied cooling water reliably flows through the annular cooling water passage 8. With this process, the cooling water cools the tapered portion 2c thereby substantially cooling the ejecting hole 1. Thus, the cooling effect for the plasma arc which passes through the ejecting hole 1 is enhanced and it is possible to make thinner the plasma arc.

Next, the configuration of the torch body B will be explained.

The plasma torch of the present embodiment is configured such that the electrode 11 can be attached to and detached from the electrode base 12 provided at the center of the torch body B. On the outer periphery of the electrode 11, the cylindrical centering stone 13 which has an insulating property is provided. The centering stone 13 has the hole 13a through which the plasma gas passes. Further, the outer periphery of the centering stone 13, the nozzle A is disposed. By fastening the inner cap which constitutes the nozzle A with the nozzle base 14 which constitutes the torch body B, the rear end surface 2h of the inner nozzle 2 is in surface contact with the end surface 14a of the nozzle base 14, and the nozzle A and the centering stone 13 are fixed to the torch body B.

The front end surface 14a of the nozzle base 14 is formed so as to be perpendicular to the axis of the torch body B. At the front side of the nozzle base 14, the recess portion 14b for receiving the fitting portion 2e of the inner nozzle 2 is formed. On the outer periphery of the front side of the nozzle base 14, the threaded portion 14c to which the threaded portion 3d of the inner cap 3 which constitutes the nozzle A is fastened by screwing. In the nozzle base 14, the hole 14d for fixing the codes connected to the power source (not shown) and the hole 14e for supplying the secondary airflow gas to the secondary airflow passage 4 are formed.

When the fitting portion 2e of the inner nozzle 2 is fitted to the recess portion 14b of the nozzle base 14, the end surface 14a is in surface contact with the rear end surface 2h of the inner nozzle 2. The O-ring disposed on the outer periphery of the fitting portion 2e is in contact with the inner peripheral surface of the recess portion 14b thereby preventing leakage of the cooling water.

In the torch body B, the cooling tube 17 is provided on the axis and a supply tube (not shown) of the cooling water is connected to the cooling tube 17. By attaching the electrode 11 to the electrode base 12, the electrode 11 is opposed to the open end side of the cooling tube 17 and the water passage 18 which is continuous from the inner periphery to the outer periphery of the cooling tube 17 is formed. The water passage 18 is connected to the supply passage 20 formed on the end surface 14a of the nozzle base 14 through the water passage 19 formed on the torch body B and the nozzle base 14, and is further connected to the independent water passage 9 of the nozzle A from the water supply passage 20. On the end surface 14a of the nozzle base 14, the water drain passage 21 is formed at the position opposite to the water supply passage 20 with respect to the axis. The water passage 22 is connected to the water drain passage 21 and further a water drain tube (not shown) is connected to the water passage 22.

Figure 2:
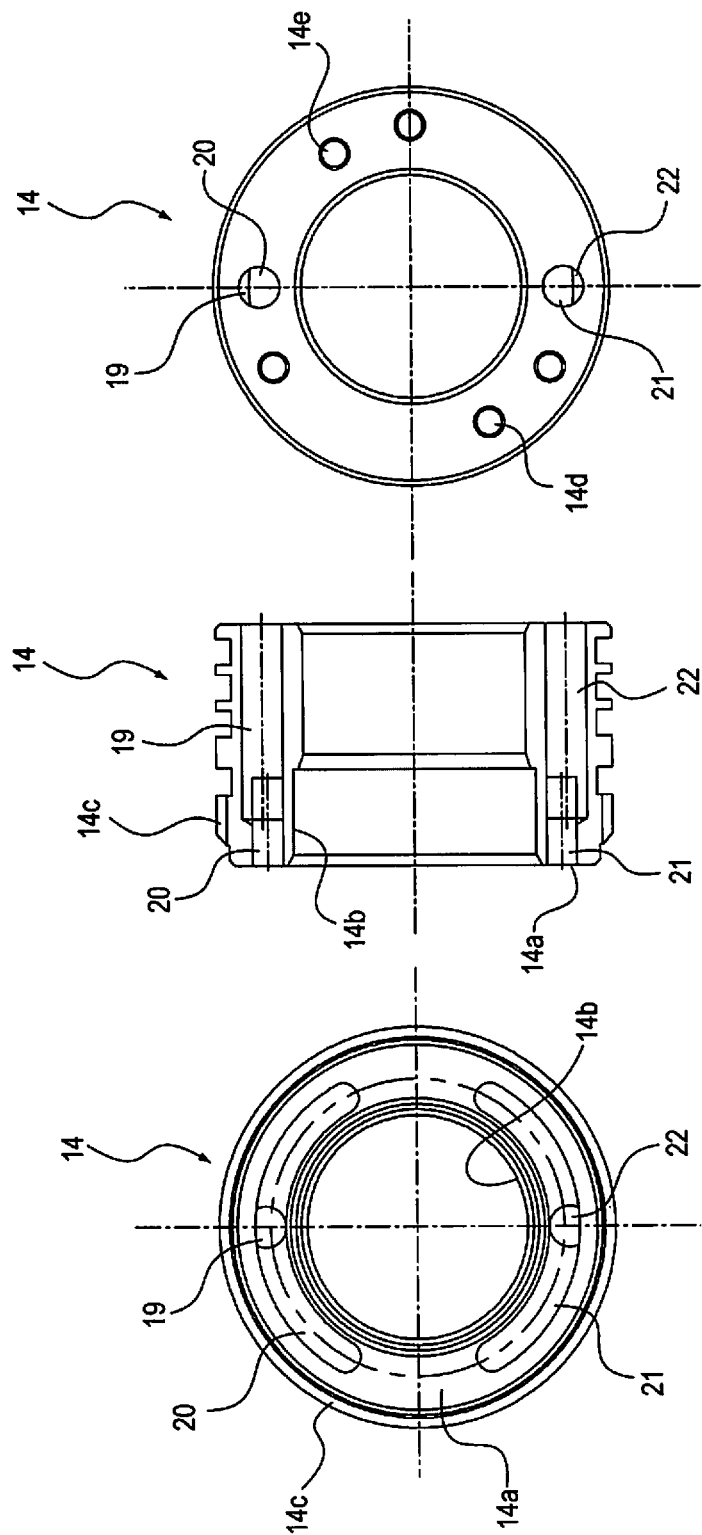
Figure 3:
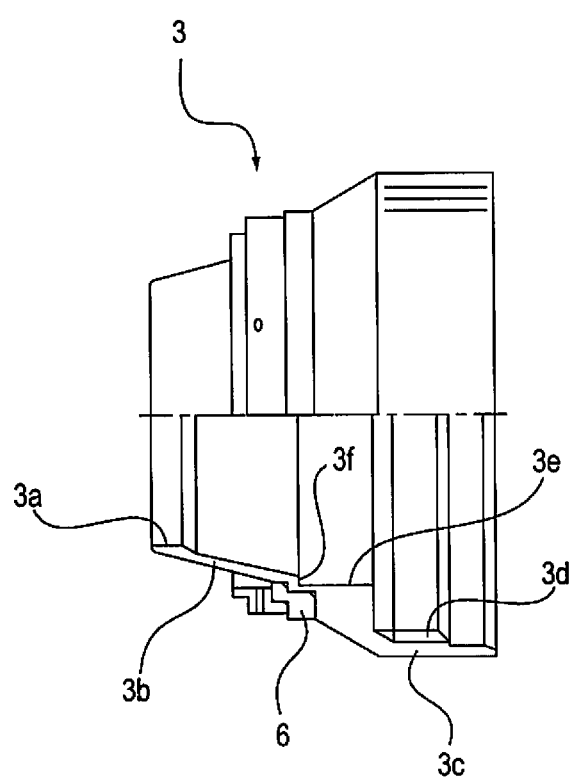
Figure 4:
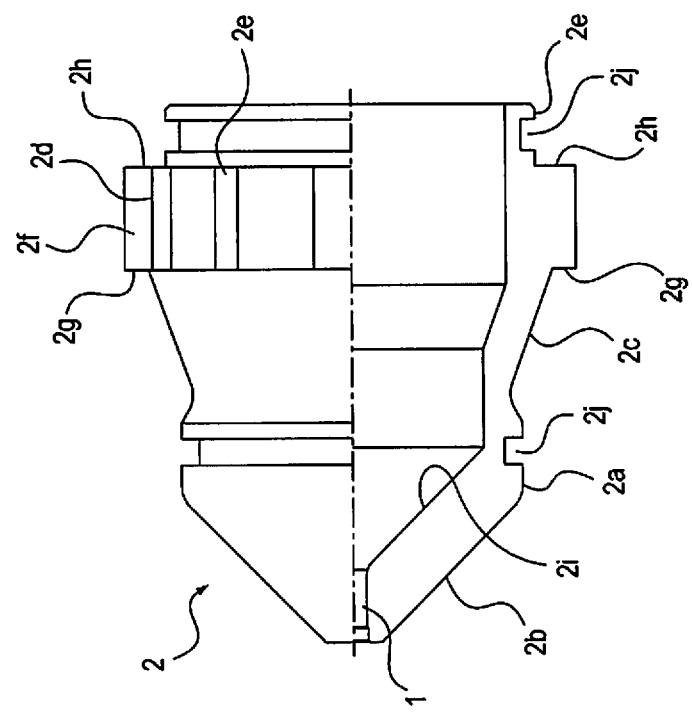
Figure 4:
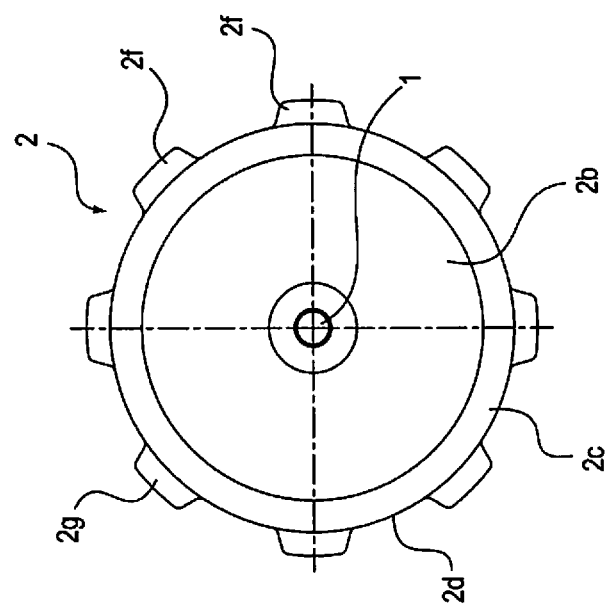
Figure 5:
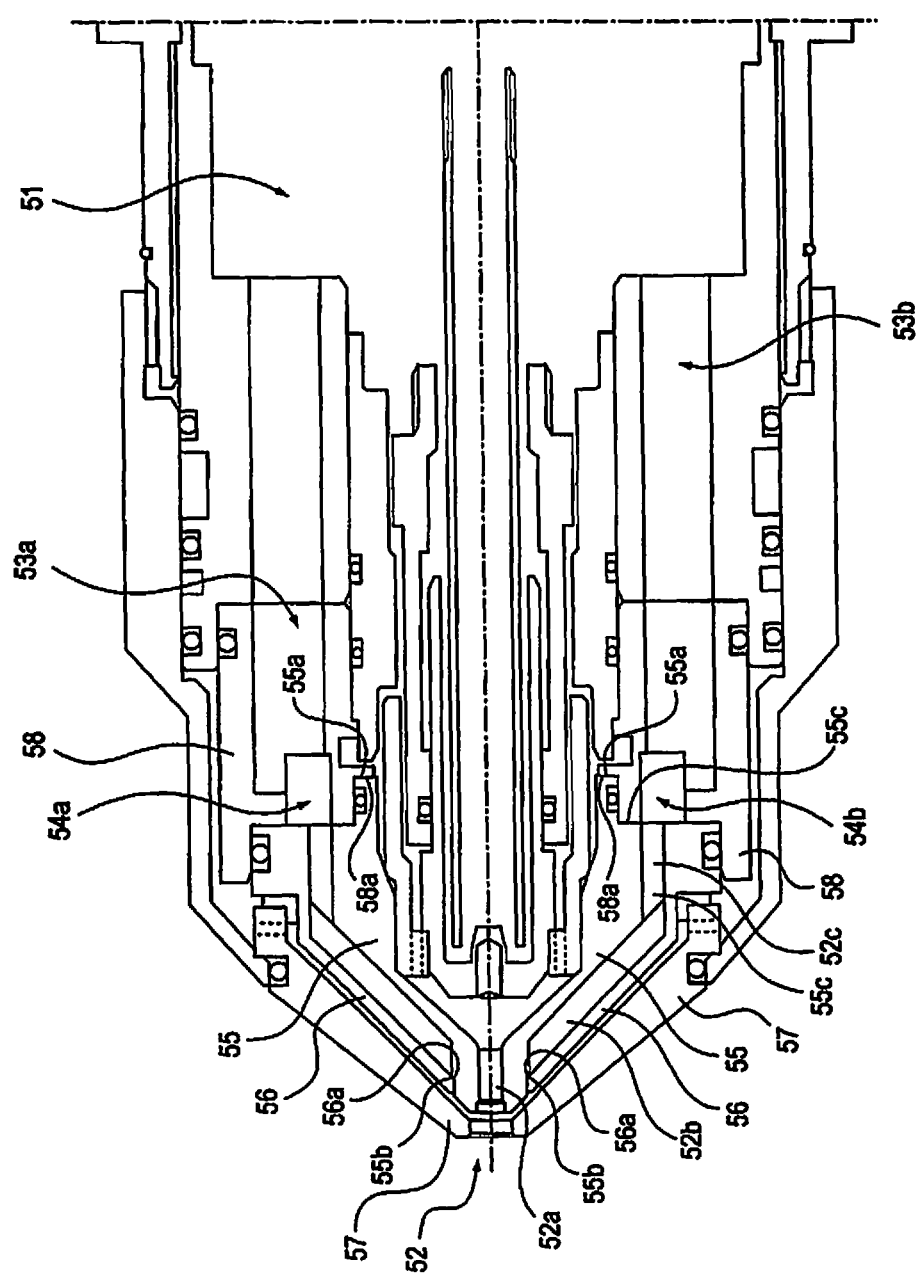

As shown in FIG. 2, the water supply passage 20 and the water drain passage 21 are configured as grooves which are formed in arcs with the center of a circle being the axis of the torch body B with respect to the holes which constitute the water passages 19 and 22, respectively. However, it is not necessary for both of the water supply passage 20 and the water drain passage 21 to be of an arc-like shape and it is sufficient for at least one of the water supply passage 20 and the water drain passage 21 to be of an arc-like shape. The length of the grooves which constitute the water supply passage 20 and the drain water passage 21 corresponds to the length of the independent water passages 9 (the length on the rear end surface 2h).

The intervals between the ends of the groove constituting the water supply passage 20 and the ends of the groove constituting the drain water passage 21 are set to be larger than the width of the independent water passage 9. On the portion other than the portion between the ends of the grooves, the water supply passage 20 and the water drain passage 21 are formed. When the nozzle A is attached to the nozzle base 14, it is not preferable for an independent water passage 9 to be connected to both of the water supply passage 20 and the water drain passage 21. Thus, by setting the interval between the water supply passage 20 and the drain water passage 21 with reference to the width of the independent water passages 9, even if the nozzle A is attached to the nozzle base 14 in any situation, any one of the independent water passages 9 does not communicate with both of the water supply passage 20 and the water drain passage 21.

The procedure for constituting a plasma torch by attaching the nozzle A to the torch body B configured as above will be explained.

Previously, the inner nozzle 2 is fitted to the inner cap 3 thereby constituting the nozzle A. At this time, it is not necessary for the front end surface 2g of the partition 2f formed on the inner nozzle 2 to be in contact with the contact surface 3f of the inner cap 3. Further, the nozzle base 14 is previously disposed in the torch body B and the electrode 11 is attached to the electrode base 12. Furthermore, the centering stone 13 is fitted is attached with the electrode 11 being fitted to the centering stone 13.

The fitting portion 2e of the inner nozzle 2 which constitutes the nozzle A is fitted to the recess portion 14b of the nozzle base 14 and the threaded portion 3d of the inner cap 3 is screwed to the threaded portion 14c of the nozzle base 14. With the screwing of the inner cap 3, the contact portion 3f becomes in contact with the front end surface 2g of the partition 2f of the inner nozzle 2 and a fastening force produced at the time of fastening is transmitted to the partition 2f (the inner nozzle 2). Then, the rear end surface 2h of the inner nozzle 2 becomes in contact with the end surface 14a of the nozzle base 14.

By the fastening force produced by further fastening of the inner cap 3, the rear end surface 2h of the inner nozzle 2 is pressed on the end surface 14a of the nozzle base 14. With this operation, one of the independent water passages 9 is opposed to and communicates with the water supply port 20 and another one of the independent water passages 9 is opposed to and communicates with the water drain port 21. When the fastening of the inner cap 3 to the nozzle base 14 is ended, the nozzle A is attached to the torch body B.

When the cooling water is provided to the torch body B with the nozzle A being attached to the torch body B, the provided cooling water passes through the water passage 18 formed inside the cooling tube 17 and cools the electrode 11 with the provided cooling water being in contact with the inner surface of the electrode 11. Thereafter, the provided cooling water passes through the water passage 19 and reaches the water supply passage 20. Thereafter, the provided cooling water is provided to the nozzle A.

The cooling water supplied to the nozzle A cools the nozzle A when passing through the annular water passage 8 from the independent water passage 9. Thereafter, the cooling water is drained to the water drain passage 21 formed from the independent water passage 9 to the nozzle base 14. Thereafter, the cooling water is drained outside the torch body B by passing through the water passage 22 and the water drain tube (not shown).

With the nozzle A and the torch B being cooled as stated above, the plasma gas is supplied to the plasma chamber 23 formed around the electrode 11 via the centering stone 13. Next, an electric discharge is formed by energizing the nozzle base 14, thereby forming a pilot arc. At this time, the rear end surface 2h of the inner nozzle 2 is pressed on the end surface 14a of the nozzle base 14 and the cooling water passes in the very vicinity of rear end surface 2h and the end surface 14a. Thus, the rear end surface 2h and the end surface 14a are sufficiently cooled. Thus, a stable energization state can be obtained without considering a temperature rise with the energization, which contributes to forming a stable pilot arc.

The pilot arc formed between the electrode 11 and the inner nozzle 2 is ejected from the ejecting hole 1 toward the material to be cut (not shown). By energizing between the electrode 11 and the material to be cut in order to form a plasma arc (main arc) after the pilot arc reaches the material to be cut. By melting the material to be cut with this plasma arc and by eliminating the melted portion of the material to be cut, a groove which has a void portion in the thickness direction, which is made by the elimination of the melted portion.

Accordingly, while maintaining the energization between the electrode 11 and the material to be cut to form a plasma arc, the plasma torch and the material to be cut are moved relatively to each other in a desired direction. Thus, a continuous groove on the material is formed, thereby cutting the material in a desired shape.

INDUSTRIAL APPLICABILITY

The plasma torch according to the present invention can be used for plasma cutting or welding.

EXPLANATION OF REFERENCES

A nozzle
B torch body
1 ejecting hole
2 inner nozzle
2a wall portion
2b, 2c tapered portion, the tapered surface
2d base portion
2e fitting portion
2f partition
2g front end surface
2h rear end surface
2i surface
2j groove
3 inner cap
3a fitting hole
3b tapered portion, the tapered surface
3c base portion
3d threaded portion
3e receiving portion
3f contact surface
4 secondary airflow passage
5 secondary airflow cap
5a ejecting port
6 insulator
8 annular water passage
9 independent water passage
11 electrode
12 electrode base
13 centering Stone
13a hole
14 nozzle base
14a end surface
14b recess portion
14c threaded portion
14d, 14e hole
17 cooling tube
18, 19, 22 water passage
20 water supply passage
21 water drain passage
23 plasma chamber

The invention claimed is:

1. A plasma torch, comprising:
   a nozzle in which an ejecting hole disposed in the center of the nozzle for ejecting a plasma arc, an annular water passage for cooling water, and a plurality of independent water passages which communicate with the annular passage are formed; and
   a torch body in which a plurality of torch water passages for circulating cooling water for cooling the nozzle are formed,
   wherein the nozzle includes:
   an inner nozzle which ejects a plasma arc; and
   an inner cap which is fastened to the torch body with the inner nozzle,
   wherein a plurality of partitions are formed integrally with the inner nozzle on an outer side of the inner nozzle, and
   wherein when the inner nozzle is fitted to the inner cap, the annular water passage is formed between the inner nozzle and the inner cap, the plurality of independent water passages which communicate with the annular water passage are formed by the plurality of partitions, and a fastening force for fastening the inner cap to the torch body is transmitted from the inner nozzle to the torch body via the plurality of partitions by the inner cap being in contact with ends of the plurality of partitions,
   wherein the torch body includes:
   a water supply port which is connected to one of the independent water passages for supplying the cooling water to the nozzle; and
   a water drain port which is connected to one of the plurality of the independent water passages for draining the cooling water which has passed through the nozzle,
   wherein the water supply port and the water drain port are formed on an end surface of a nozzle base having electrical conductivity, the water supply port is configured as a first groove connected to one of the torch water passages, the water drain port is configured as a second groove connected to another one of the torch water passages, at least one of the first and second grooves having an arcuate shape, the first groove and the second groove extend on a plane which crosses the axes of the torch water passages, and an interval on a circumference of a circle between an end of the first groove and an adjacent end of the second groove is greater than a pitch on a circumference of a circle extending between the partitions on the nozzle that forms the independent water passages, and
   wherein when the nozzle is fastened to the torch body, one of the independent water passages formed on the nozzle communicates with the water supply port, another one of the independent water passages formed on the nozzle communicates with the water drain port, and an end surface at a partition side of the inner nozzle constituting the nozzle is able to be in contact with an end surface of the nozzle base so as to obtain energization.

* * * * *